United States Patent
Koehl et al.

(10) Patent No.: US 11,185,091 B2
(45) Date of Patent: Nov. 30, 2021

(54) METHODS OF RINSING NOZZLE FOR FROZEN FOOD PRODUCT DISPENSING MACHINE

(71) Applicant: The Vollrath Company, L.L.C., Sheboygan, WI (US)

(72) Inventors: Richard Koehl, Sheobygan Falls, WI (US); Ken Wetenkamp, Plymouth, WI (US)

(73) Assignee: THE VOLLRATH COMPANY, L.L.C., Sheboygan, WI (US)

( * ) Notice: Subject to any disclaimer, the term of this patent is extended or adjusted under 35 U.S.C. 154(b) by 0 days.

(21) Appl. No.: 16/428,064

(22) Filed: May 31, 2019

(65) Prior Publication Data

US 2020/0375214 A1 Dec. 3, 2020

(51) Int. Cl.
*A23G 9/30* (2006.01)
*A23G 9/22* (2006.01)
*B67D 3/00* (2006.01)
*B08B 9/032* (2006.01)
*A23G 9/28* (2006.01)

(52) U.S. Cl.
CPC ............ *A23G 9/30* (2013.01); *A23G 9/222* (2013.01); *A23G 9/28* (2013.01); *B08B 9/032* (2013.01); *B67D 3/0058* (2013.01)

(58) Field of Classification Search
CPC . A23G 9/30; A23G 9/222; A23G 9/28; B67D 3/0058; B67D 1/07; B67D 1/0834; B67D 1/0837; B67D 2210/00057; B08B 9/032; A47J 31/60

See application file for complete search history.

(56) References Cited

U.S. PATENT DOCUMENTS

| 3,420,268 | A | * | 1/1969 | Martin | A23G 9/282 137/897 |
| 4,592,490 | A | | 6/1986 | Mcmichael | |
| 5,603,257 | A | | 2/1997 | Kateman et al. | |
| 5,962,035 | A | * | 10/1999 | Masse | A23G 3/2015 425/131.1 |
| 6,287,515 | B1 | | 9/2001 | Koosman et al. | |
| 6,405,900 | B1 | | 6/2002 | Kown | |
| 2013/0279288 | A1 | * | 10/2013 | Dong | A23G 9/30 366/138 |

(Continued)

FOREIGN PATENT DOCUMENTS

JP 3789808 B2 6/2006
WO WO-2006104385 A1 * 10/2006 ............... B08B 3/02

*Primary Examiner* — Natasha N Campbell
(74) *Attorney, Agent, or Firm* — Foley & Lardner LLP

(57) ABSTRACT

A method of using a frozen food product dispensing machine includes producing, by the frozen food product dispensing machine, a frozen food product, and dispensing, by the frozen food product dispensing machine, the frozen food product through a nozzle passage of a nozzle coupled to the frozen food product dispensing machine. The nozzle defines a food product inlet fluidly coupled to the frozen food product dispensing machine and a food product outlet. The nozzle passage extends between the food product inlet and the food product outlet. The method includes introducing, by a cleaning fluid source, a cleaning fluid into the nozzle passage through a cleaning fluid inlet in the nozzle. The cleaning fluid inlet is fluidly coupled to the nozzle passage between the food product inlet and the food product outlet.

9 Claims, 13 Drawing Sheets

(56) References Cited

U.S. PATENT DOCUMENTS

2016/0316782 A1 11/2016 Tuchrelo et al.
2017/0347682 A1* 12/2017 Dong ................. A23G 9/30
2018/0111173 A1 4/2018 Bertness et al.

* cited by examiner

METHODS OF RINSING NOZZLE FOR FROZEN FOOD PRODUCT DISPENSING MACHINE

BACKGROUND

The present disclosure relates generally to the field of frozen food product dispensing machines. More specifically, the present disclosure relates to methods of cleaning frozen food product dispensing machines.

Frozen food product dispensing machines are used to dispense soft confectionary food products such as aerated ice cream, custard, frozen yogurt, sherbets, sorbets, or other similar frozen food products. Such dispensing machines can include one or more freezer barrels, within which the food products are cooled to the point of freezing. The frozen food product is dispensed through a nozzle and into a dish or cone. Over time, food product can build up within the nozzle. Cleaning out the built up food product can be a time-consuming and labor-intensive process.

SUMMARY

At least one embodiment relates to a method of using a frozen food product dispensing machine. The method includes producing, by the frozen food product dispensing machine, a frozen food product and dispensing, by the frozen food product dispensing machine, the frozen food product through a nozzle passage of a nozzle coupled to the frozen food product dispensing machine. The nozzle defines a food product inlet fluidly coupled to the frozen food product dispensing machine and a food product outlet. The nozzle passage extends between the food product inlet and the food product outlet. The method includes introducing, by a cleaning fluid source, a cleaning fluid into the nozzle passage through a cleaning fluid inlet in the nozzle. The cleaning fluid inlet is fluidly coupled to the nozzle passage between the food product inlet and the food product outlet.

Another embodiment relates to a frozen food product dispensing system. This system includes a dispensing machine, a cleaning fluid reservoir configured to store a cleaning fluid, a pump fluidly coupled to the cleaning fluid reservoir and configured to supply the cleaning fluid from the cleaning fluid reservoir, and a nozzle coupled to the dispensing machine. The dispensing machine includes a housing, a freezer barrel coupled to the housing and configured to contain a frozen food product, the freezer barrel defining a freezer barrel aperture, and a cover coupled to the housing. The cover defines a cover passage fluidly coupled to the freezer barrel aperture. The nozzle defines a nozzle passage extending between a food product inlet and a food product outlet, the food product inlet being fluidly coupled to the cover passage, and a cleaning fluid inlet fluidly coupled to the nozzle passage between the food product inlet and the food product outlet. The cleaning fluid inlet is fluidly coupled to the pump such that the nozzle passage is configured to receive the cleaning fluid from the cleaning fluid reservoir through the cleaning fluid inlet.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
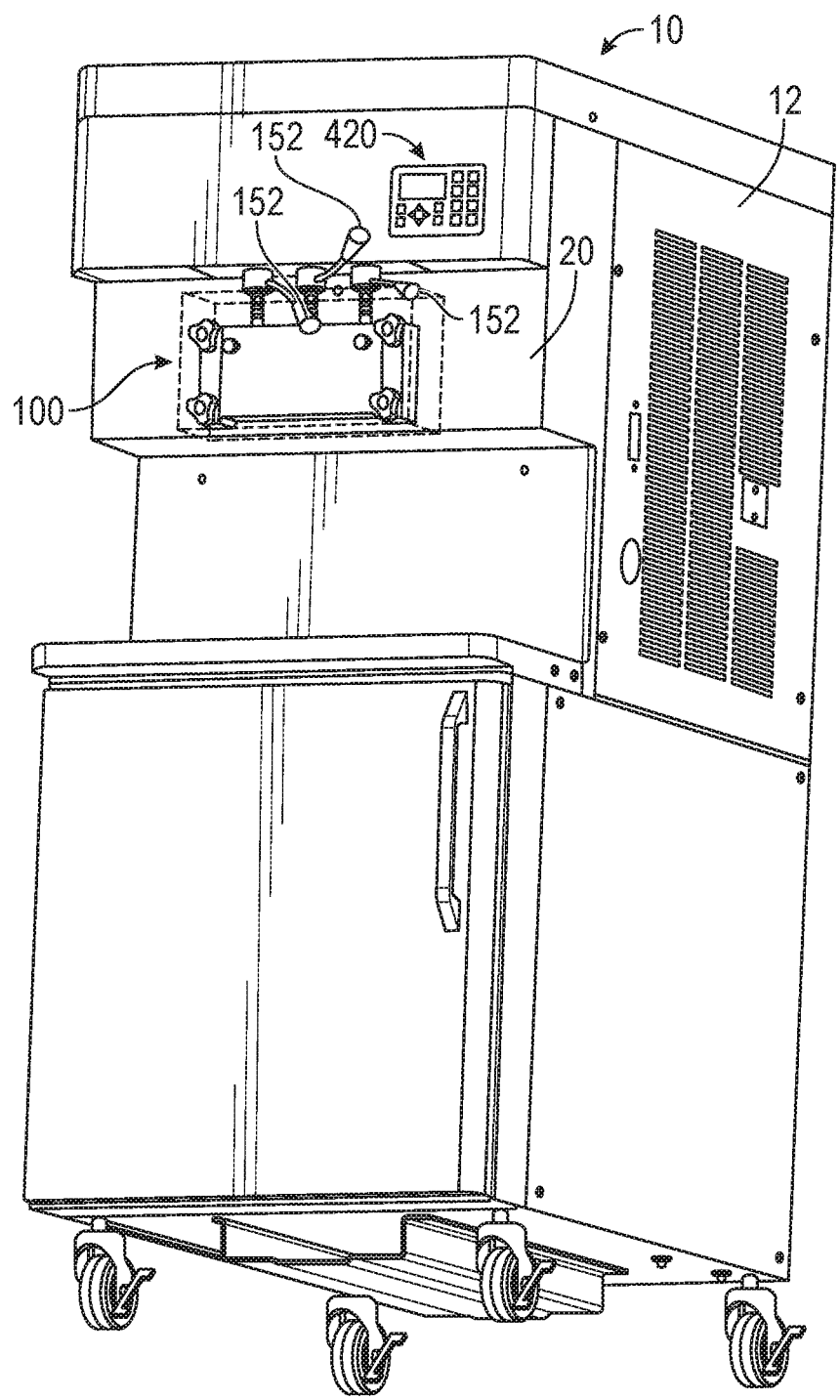
FIG. 1 is a perspective view of a frozen food product dispensing machine, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, a frozen food product dispensing machine is configured to dispense a frozen food product. The frozen food product dispensing machine includes one or more freezer barrels in which a liquid food product is placed. The freezer barrel is cooled by a refrigeration system to freeze the food product, and an auger assembly agitates the food product as it freezes. A cover extends across an opening of the freezer barrel, and the food product is directed into one or more passages defined by the cover. A valve member extends into each passage, selectively preventing the flow of frozen food product through each passage.

A spigot protrusion extends downward from the cover, substantially centered about a longitudinal axis of each passage. A nozzle is selectively coupled to each spigot protrusion. Each nozzle defines a food product inlet, a food product outlet, and a nozzle passage extending therebetween. A cap is selectively coupled to each nozzle and extends across the food product outlet. The caps each define a forming aperture having a shape corresponding to a desired cross-sectional shape of the dispensed food product. During operation, food product passes from the passage of the cover, through the nozzle passage of the nozzle, and out through the forming aperture of the cap. A portion of this food product can remain after dispensing, coating inner surfaces of the nozzle and the cap.

To facilitate cleaning of the nozzle and the cap without removal from the dispensing machine, the nozzle defines a cleaning fluid inlet fluidly coupled to the nozzle passage between the food product inlet and the food product outlet. The cleaning fluid inlet is coupled to a hose or other fluid conduit, which is in turn coupled to a source of cleaning fluid. To clean the nozzle and the cap, the cleaning fluid source selectively supplies cleaning fluid through the hose and the cleaning fluid inlet to the nozzle passage of the nozzle. The cleaning fluid removes food product from inner surfaces of the nozzle and the cap and sanitizes the nozzle and the cap. The cleaning fluid then drains out through the forming aperture.

According to the exemplary embodiment shown in FIGS. 1-5, a frozen food product dispensing system includes a frozen food product dispensing machine, shown as dispensing machine 10. The dispensing machine 10 includes a valve assembly or dispensing assembly, shown as dispensing system 100, that control flows of frozen food product from the dispensing machine 10. According to the exemplary embodiment shown in FIGS. 1-3, the dispensing machine 10 is a multi-barrel (e.g., a two-barrel, etc.) frozen food product dispensing machine configured to dispense multiple types of frozen food product (e.g., a first flavor, a second flavor, a swirl or combination flavor, etc.). In other embodiments, the dispensing machine 10 is a single-barrel frozen food product dispensing machine. The dispensing machine 10 may be any type of frozen food product dispensing machine (e.g., a frozen yogurt dispensing machine, a frozen treat dispensing machine, an ice-cream dispensing machine, a custard dispensing machine, a slushie machine, etc.) configured to dispense any type of frozen food product (e.g., yogurt, ice-cream, custard, slushie, etc.).

Figure 2:
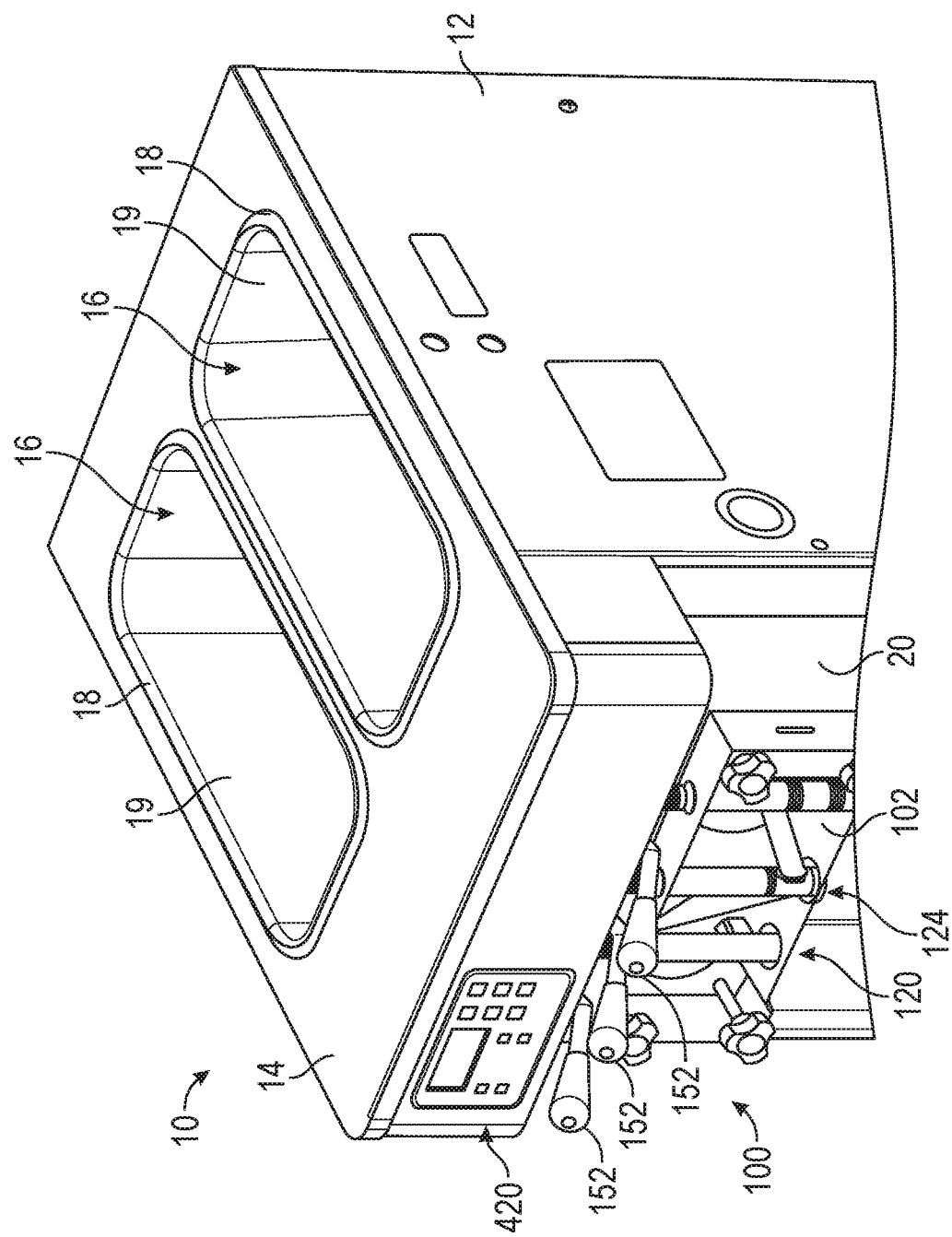
FIG. 2 is a perspective view of a portion of the frozen food product dispensing machine of FIG. 1.
Figure 3:
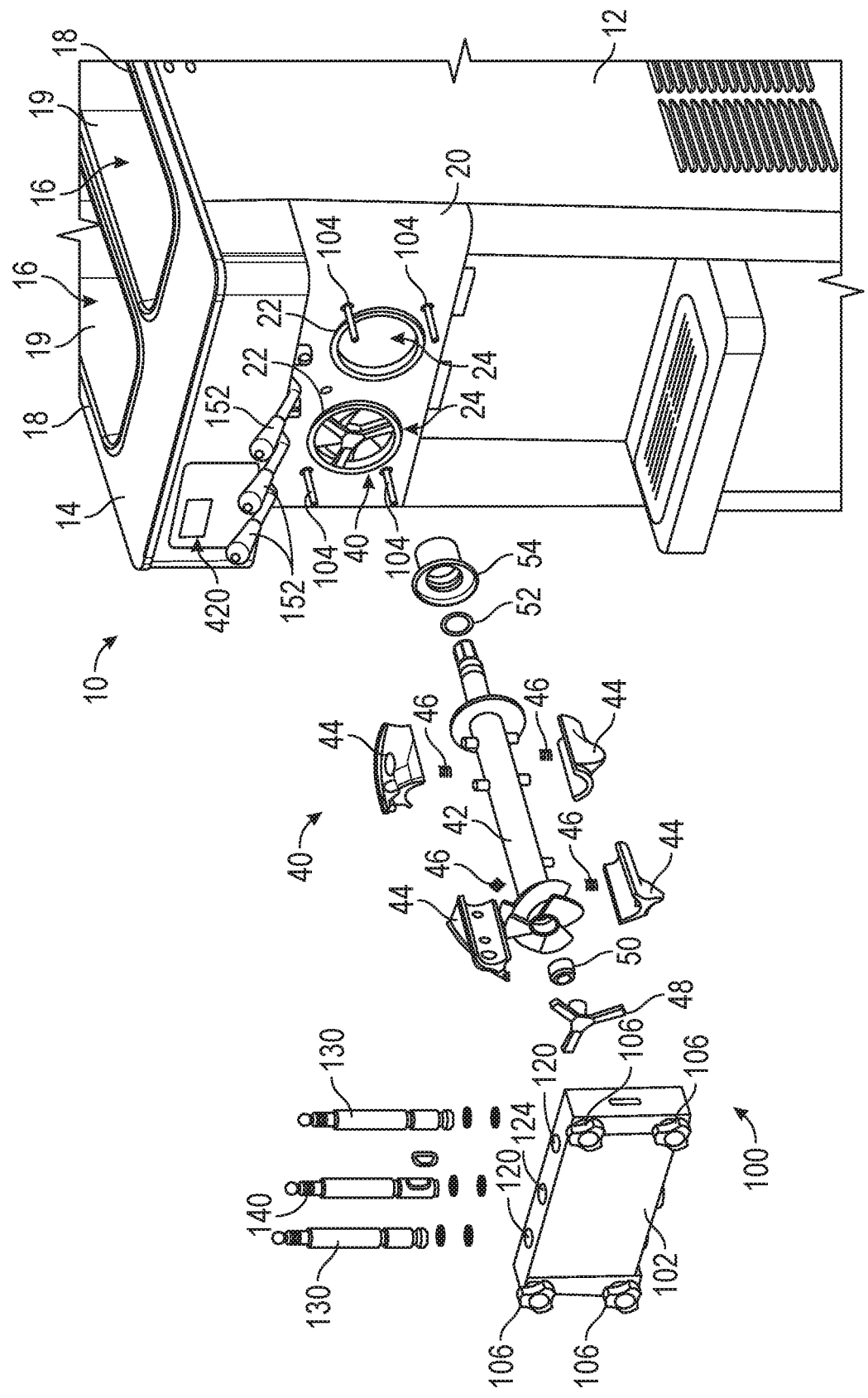
FIG. 3 is an exploded view of the frozen food product dispensing machine of FIG. 1.

As shown in FIGS. 1-3, the dispensing machine 10 further includes a user interface, shown as user interface 420. In one embodiment, the user interface 420 includes a display and an operator input. The display may be configured to display a graphical user interface, an image, an icon, or still other information. In one embodiment, the display includes a graphical user interface configured to provide general information about the dispensing machine 10 (e.g., mixture levels, mixture temperature, etc.). The graphical user interface may also be configured to display an indication that the dispensing machine 10 is due for cleaning, maintenance, and/or repair. The operator input may be used by an operator to provide commands to the dispensing machine 10 (e.g., a desired temperature of the mixture, etc.). The operator input may include one or more buttons, knobs, touchscreens, switches, levers, joysticks, pedals, and/or handles. The operator may be able to manually control some or all aspects of the operation of dispensing machine 10 using the display and the operator input.

As shown in FIGS. 2 and 3, the dispensing machine 10 includes a main body, shown as housing 12, a first surface, shown as top surface 14, and a second surface, shown as front surface 20. The top surface 14 defines a pair of openings or cavities, shown as hopper cavities 16, that provide access to an interior of the housing 12 of the dispensing machine 10. According to an exemplary embodiment, the hopper cavities 16 facilitate pouring a food product mixture (e.g., a treat mixture, a yogurt mixture, an ice-cream mixture, a custard mixture, a slushie mixture, and/or another type of mixture) into the dispensing machine 10. As shown in FIGS. 1-3, the hopper cavities 16 have an inner, peripheral wall, shown as hopper wall 19, and a retaining structure, shown as lip 18, extending outward from the hopper wall 19 of each hopper cavity 16 and along the top surface 14. In other embodiments, the lip 18 is omitted (e.g., another type of retaining structure may be included, etc.). Alternatively, collapsible bags or another type of reservoir are used to hold the food product mixture instead of the hopper cavities 16.

As shown in FIG. 3, the dispensing machine 10 includes a pair of containers, shown as freezer barrels 22, that extend partway into and coupled to the housing 12. A freezer barrel aperture, shown as opening 24, of each of the freezer barrels 22 extends through the front surface 20 such that the interior of the freezer barrels 22 can be accessed from the front of the dispensing machine 10. Each freezer barrel 22 is fluidly coupled to one of the hopper cavities 16. In other embodiments, one freezer barrel 22 is coupled to multiple hopper cavities 16. As shown in FIG. 3, each freezer barrel 22 receives an agitator, shown as auger assembly 40. According to an exemplary embodiment, the auger assemblies 40 are configured to rotate within the corresponding freezer barrels 22 to agitate (e.g., mix, redistribute, etc.) the mixture poured into the dispensing machine 10 through the hopper cavities 16. The dispensing machine 10 includes a refrigeration system used to cool and/or freeze the mixture in the freezer barrels 22 before it is dispensed. By way of example, the refrigeration system may include cooling elements (e.g., an evaporator) in thermal communication with an outer surface of each freezer barrel 22 to remove thermal energy from each freezer barrel 22.

As shown in FIG. 3, the auger assemblies 40 each include a shaft, shown as auger shaft 42; scrapers, shown as flights 44; resilient members, shown as springs 46; a support, shown as front support 48; a bushing, shown as front bushing 50; an O-ring, shown as auger O-ring 52; and a seal, shown as rear seal 54. The flights 44 are coupled (e.g., translatably coupled) to the auger shaft 42 and configured to scrape the peripheral wall of the respective freezer barrel 22. The springs 46 are configured to impart a radially outward biasing force on each flight 44, forcing the flights 44 against the peripheral wall of the freezer barrel 22 to aid in the scraping of the peripheral wall. As the thermal energy is removed at the wall of the freezer barrel 22, scraping the wall may remove frozen food product from the wall and introduce liquid food product into contact with the wall. The front bushing 50 is configured to rotatably couple the front support 48 to the auger shaft 42, and the front support 48 is configured to axially center the auger shaft 42 and the components attached thereto within the freezer barrel 22. The auger O-ring 52 and the rear seal 54 press against the back of the freezer barrel 22 to seal the auger assembly 40 within freezer barrel 22. The auger shaft 42 extends through the rear seal 54 to couple to a driver (e.g., an electric motor) that imparts a torque onto the auger shaft 42.

As shown in FIGS. 2-5, the dispensing machine 10 includes a dispensing system, shown as dispensing system 100. According to an exemplary embodiment, the dispensing system 100 facilitates a user (e.g., customer, worker, etc.) dispensing frozen food product from the dispensing machine 10. The dispensing system 100 includes a cover, shown as front door 102. The front door 102 extends laterally, defining a width, vertically, defining a height, and longitudinally, defining a thickness of the front door 102. According to an exemplary embodiment, the front door 102 is selectively attached (e.g., coupled, fastened, etc.) to the front surface 20 of the dispensing machine 10. A series of fasteners, shown as studs 104, extend from the front surface 20 of the dispensing machine 10 and through corresponding apertures defined in the front door 102. Corresponding threaded fasteners, shown as knobs 106, are threaded onto the studs 104, pressing the front door 102 against the front surface 20. The front door 102 extends substantially laterally and vertically parallel to the front surface 20, extending across the openings 24 of both of the freezer barrels 22. Resilient members, shown as O-rings 108, lie in grooves defined by the front door 102 and surrounding the openings 24 of each of the freezer barrels 22. The O-rings 108 extend between the front surface 20 and the front door 102. A first food product volume is defined between one of the freezer barrels 22 and the front door 102. A second food product volume is defined between the other freezer barrel 22 and the front door 102. Tightening of the knobs 106 compresses the O-rings 108, preventing food product from leaking between the freezer barrels 22 and the front door 102.

Figure 4:
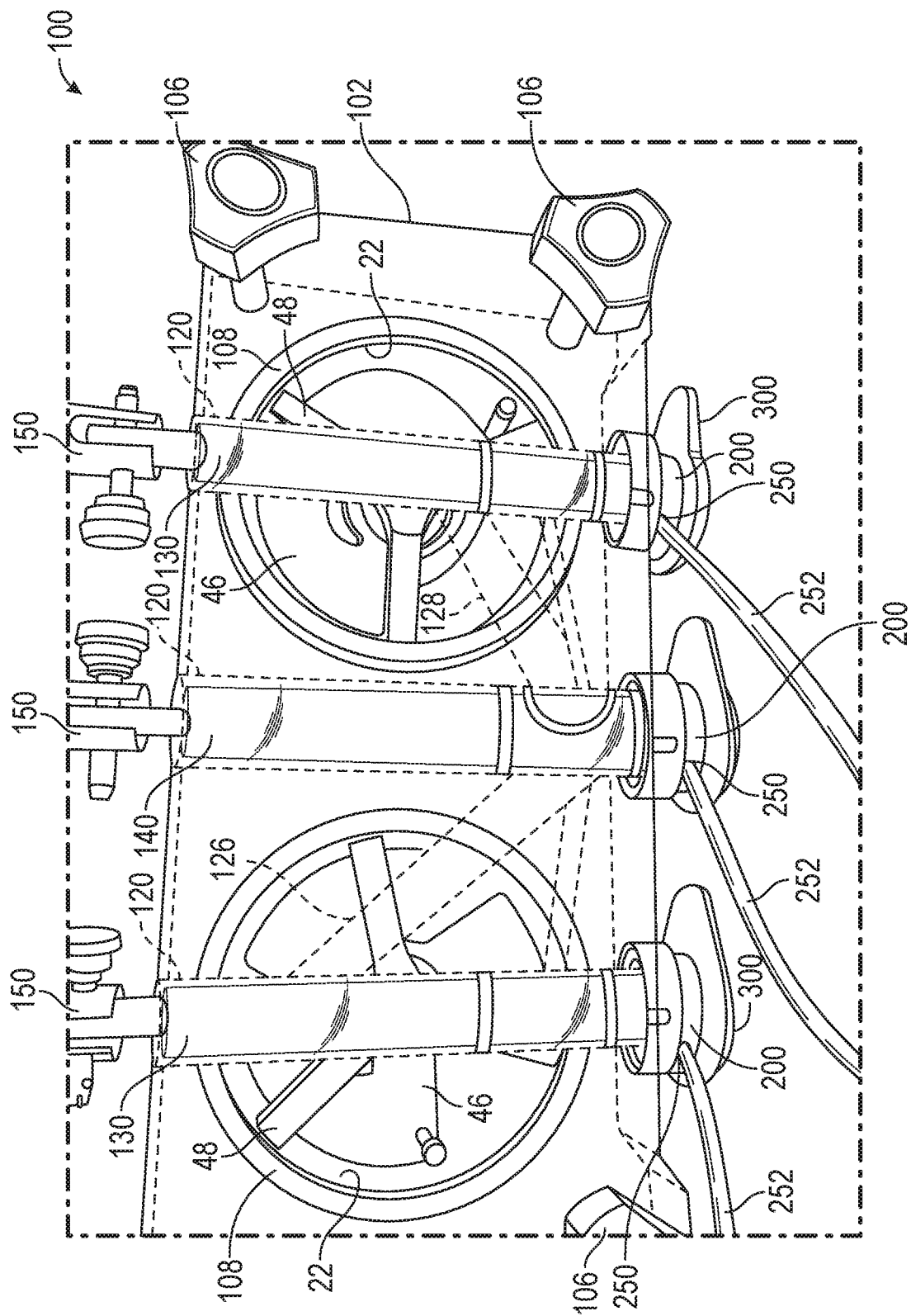
FIG. 4 is a front perspective view of a dispensing system of the frozen food product dispensing machine of FIG. 1.
Figure 5:
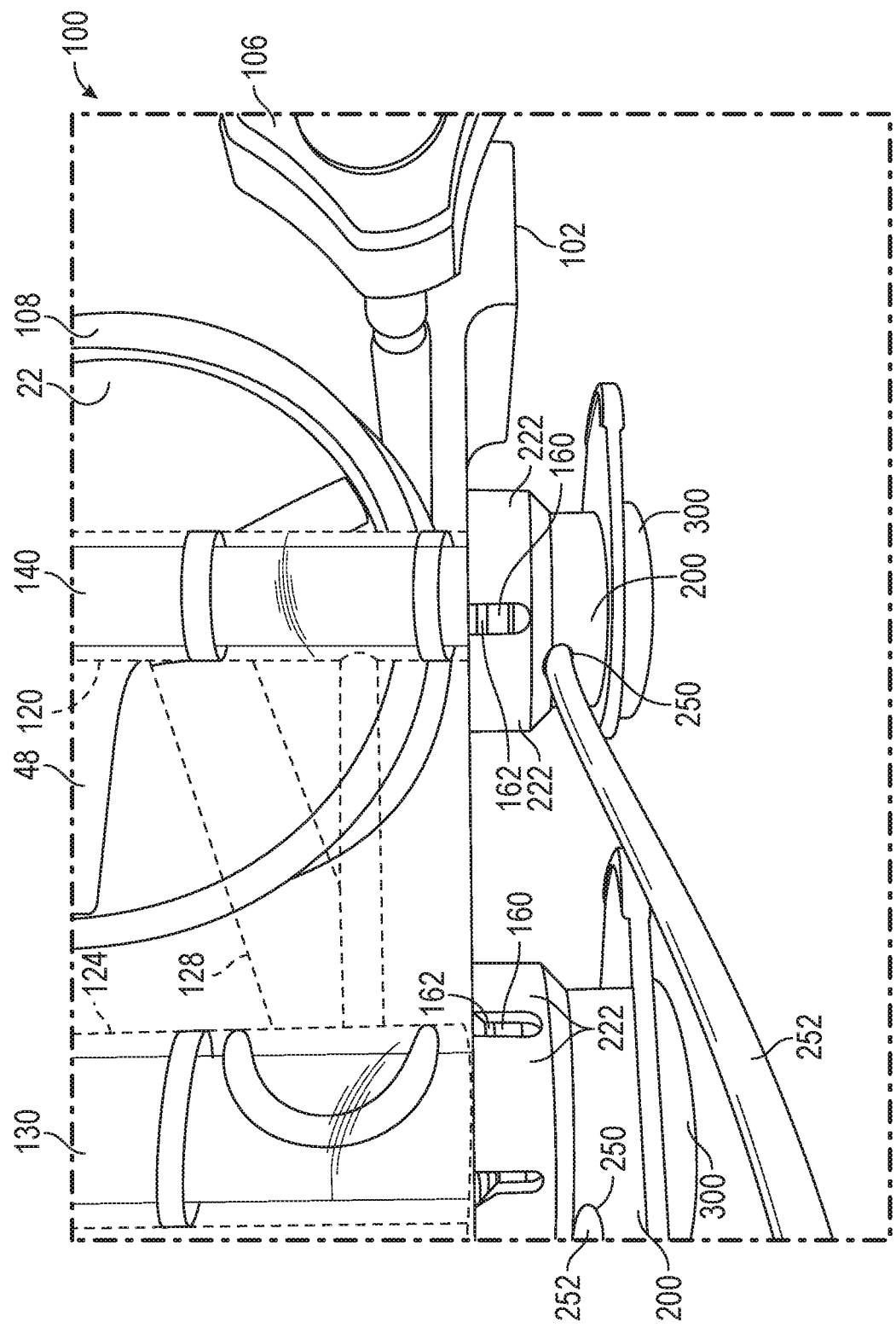
FIG. 5 is a front view of the dispensing system of FIG. 4.

Referring to FIGS. 4 and 5, a pair of apertures, cover passages, door passages, or valve member passages, shown as side valve passages 120, extend vertically through the front door 102. Each of the side valve passages 120 extend across the opening 24 of one of the freezer barrels 22. The side valve passages 120 are fluidly coupled to the corresponding food product volume (e.g., by another aperture). The front door 102 is configured such that food product in the first food product volume can flow out of the dispensing machine 10 through the side valve passage 120 corresponding with the first food product volume. The front door 102 is configured such that food product in the second food product volume can flow out of the dispensing machine 10 through the side valve passage 120 corresponding with the second food product volume. A third aperture, cover passage, door passage, mixing passage, or valve member passage, shown as mixing valve passage 124, extends vertically through the front door 102. The mixing valve passage 124 is located between the side valve passages 120. A first aperture, shown as feeding passage 126, extends between the first food product volume and the mixing valve passage 124. A second aperture, shown as feeding passage 128, extends between the second food product volume and the mixing valve passage 124. In some embodiments, the feeding passage 126 and the feeding passage 128 meet the mixing valve passage 124 at the same vertical position. The front door 102 is configured such that food product in the first food product volume and food product in the second food product volume can flow into the mixing valve passage 124 through the feeding passage 126 and the feeding passage 128, respectively, to mix the frozen food products from both food product volumes (e.g., as a swirled combination of frozen food products). The food product from the first food product volume and the second food product volume mix in the mixing valve passage 124, and the mixed food product is discharged from the dispensing machine 10 through the mixing valve passage 124.

A valve member or spigot, shown as side spigot 130, is located within each of the side valve passages 120. The side spigots 130 are vertically translatable relative to the front door 102 between a sealing position and a dispensing position. In the sealing position, shown in FIG. 4, the side spigots 130 prevent (e.g., block) the flow of food product out of the dispensing machine 10 through the corresponding side valve passages 120. In the dispensing position, the side spigots 130 are moved upwards relative to the sealing position, such that food product can flow through the side valve passages 120 and out of the dispensing machine 10 through the bottom of the corresponding side valve passage 120. A mixing spigot 140 is located within the mixing valve passage 124. The mixing spigot 140 is vertically translatable relative to the front door 102 between a sealing position and a dispensing position. In the sealing position, shown in FIG. 4, the mixing spigot 140 prevents (e.g., blocks) the flow of food product out of the dispensing machine 10 through the mixing valve passage 124. The mixing spigot 140 may also prevent the flow of food product between the feeding passages 126 and 128. In the dispensing position, the mixing spigot 140 is moved upward relative to the sealing position, such that food product can flow through the feeding passage 126 and the feeding passage 128 and out of the dispensing machine 10 through the bottom of the mixing valve passage 124. The food product that flows out of the mixing valve passage 124 may be a mixture of the food product from the first food product volume and the second food product volume (e.g., a combination or swirl, etc.).

Referring to FIG. 4, the side spigots 130 and the mixing spigot 140 are each coupled to (e.g., received by) an actuator 150. The dispensing system 100 includes a left side spigot 130 and a corresponding left side actuator 150, a mixing spigot 140 and corresponding center actuator 150, and a right side spigot 130 and a corresponding right side actuator 150. The actuators 150 are configured to translate vertically, moving the side spigots 130 and the mixing spigot 140 between their respective sealing and dispensing positions. As shown in FIG. 2, the dispensing system 100 includes user interface devices, shown as dispensing handles 152, that permit a user to control translation of the actuators 150 (e.g., through manual actuation of the dispensing handles 152, etc.), dispensing product from the dispensing machine 10. In other embodiments, translation of the actuators 150 is otherwise controlled by other user interface devices (e.g., with push-buttons, automatically activated based on sensing a cup, bowl, or cone positioned beneath the dispensing system 100, etc.). The dispensing machine 10 may include a component that facilitates translation of the actuator 150 (e.g., a motor, a pneumatic cylinder, a solenoid, etc.). The actuator 150 may be biased (e.g., by a biasing member such as a spring) in a particular direction (e.g., upwards).

Figure 6:
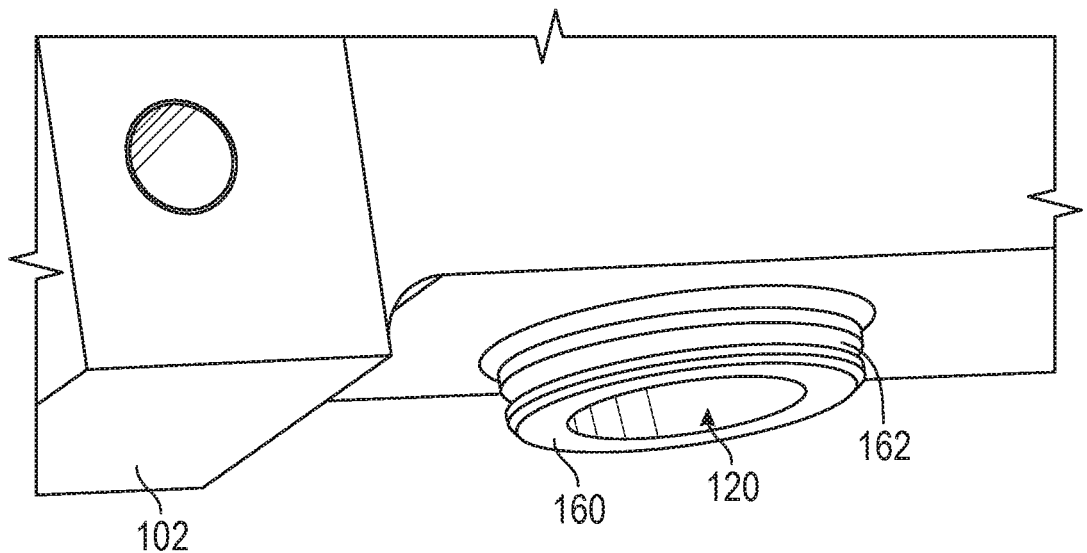
FIG. 6 is a bottom perspective view of a front door of the dispensing system of FIG. 4.
Figure 7:
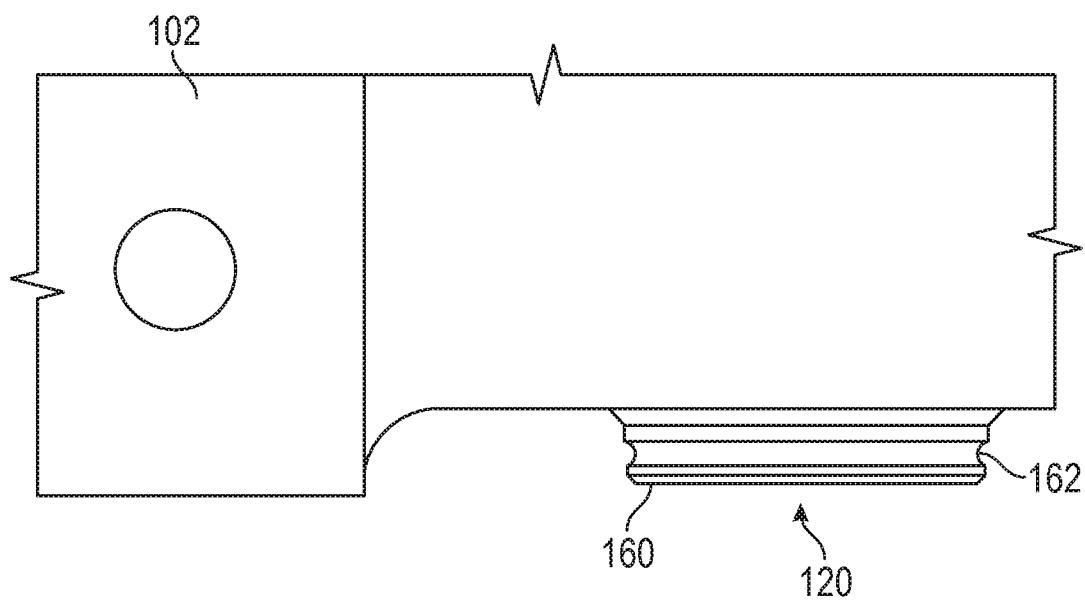
FIG. 7 is a front view of the front door of FIG. 6.
Figure 8:
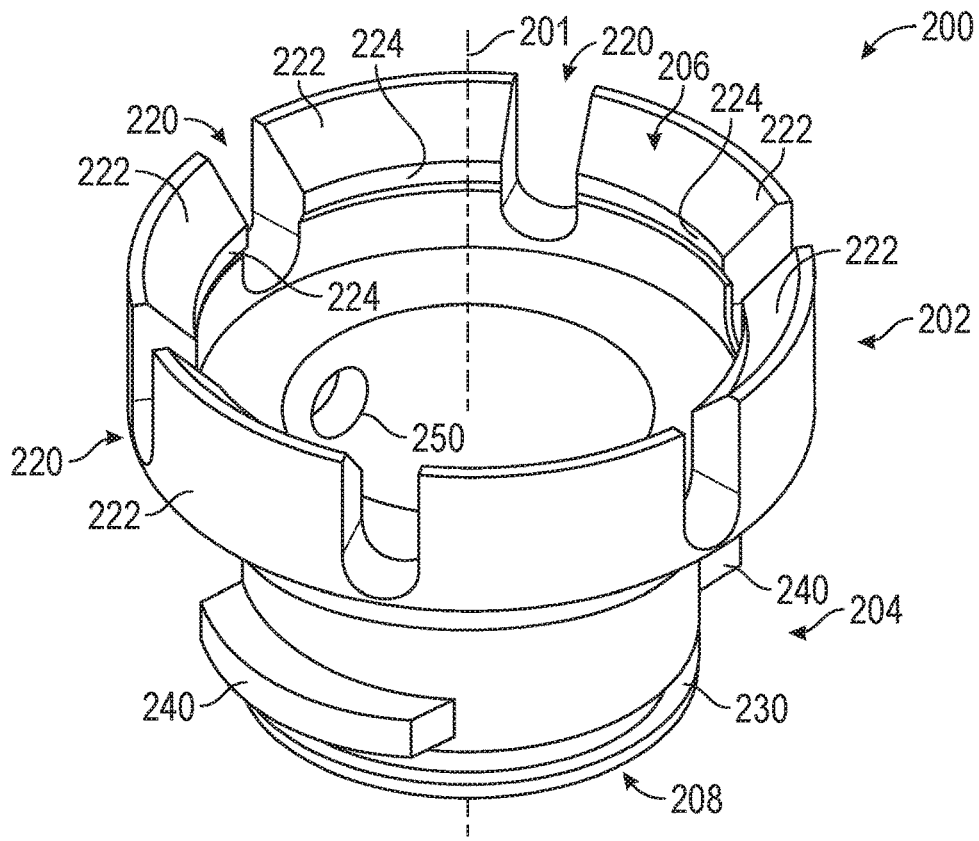
FIG. 8 is a front perspective view of a nozzle for use with a frozen food product dispensing machine, according to an exemplary embodiment.
Figure 9:
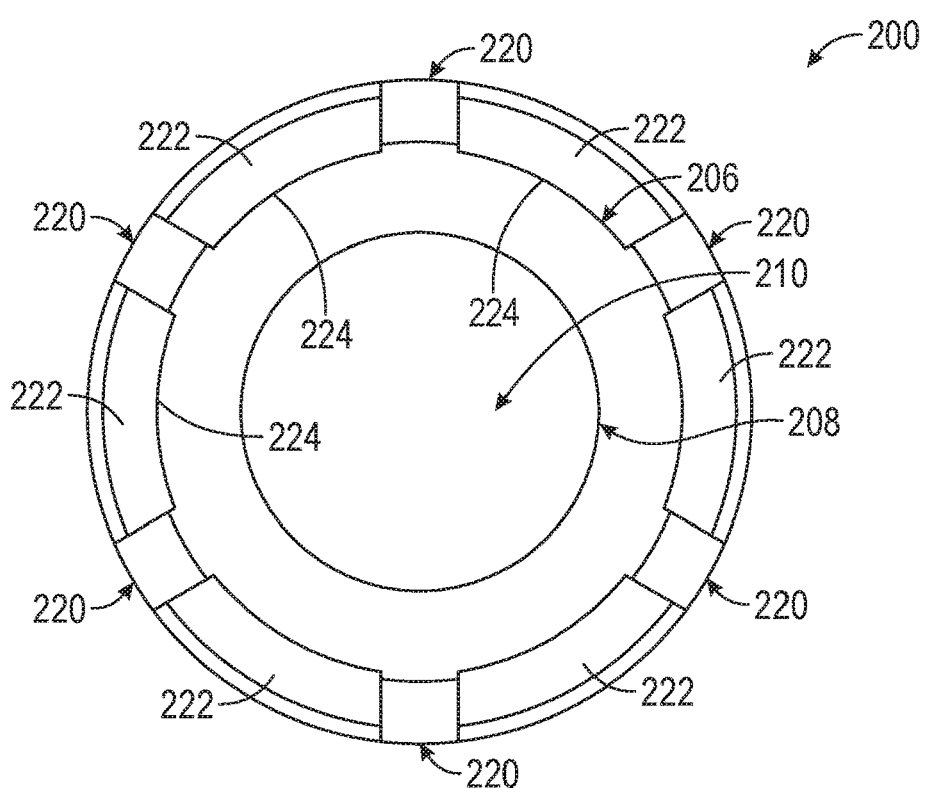
FIG. 9 is a top view of the nozzle of FIG. 8.
Figure 10:
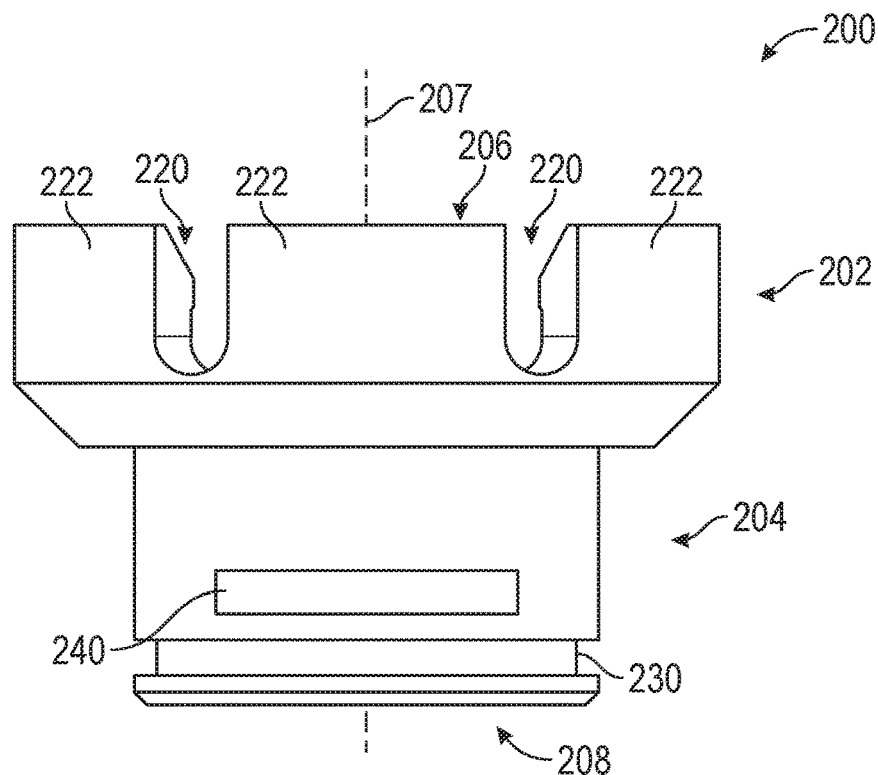
FIG. 10 is a side view of the nozzle of FIG. 8.
Figure 11:
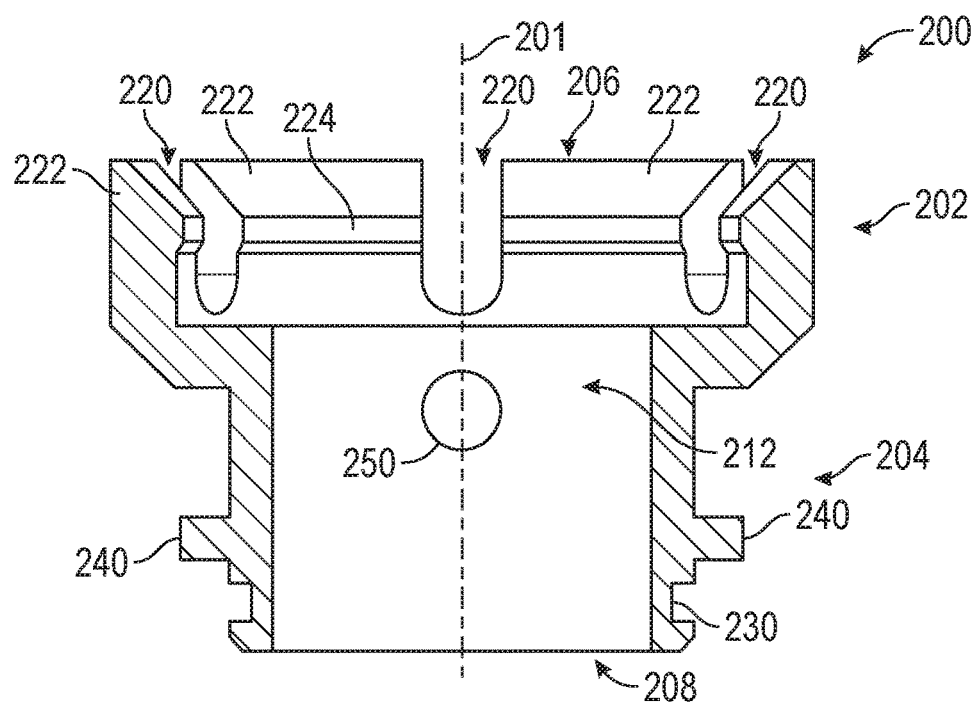
FIG. 11 is a front section view of the nozzle of FIG. 8.
Figure 12:
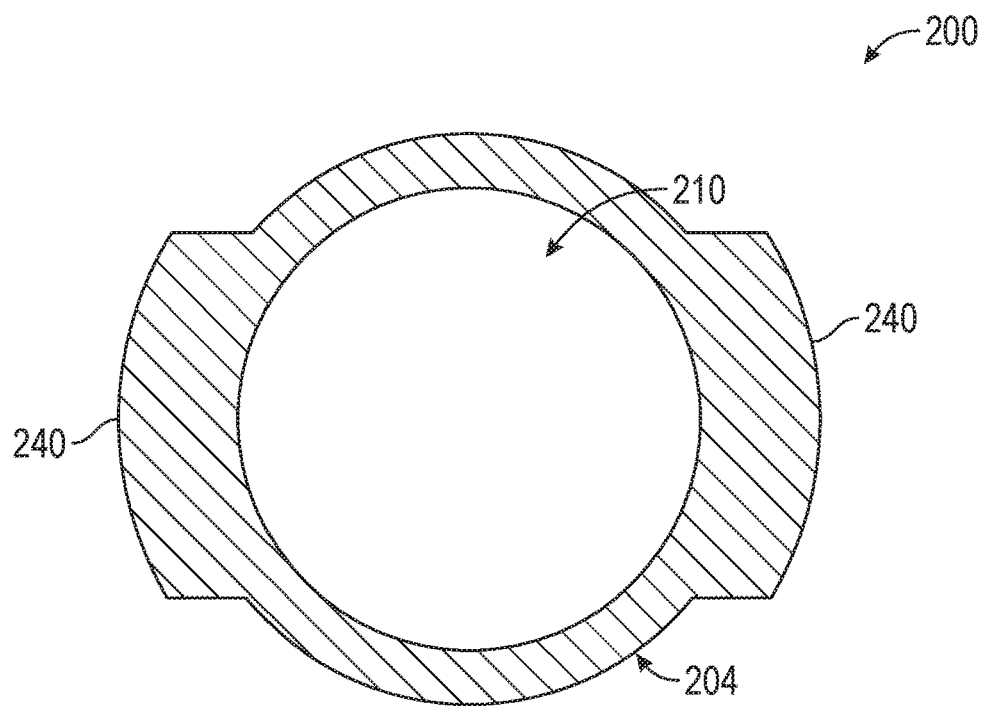
FIG. 12 is a top section view of the nozzle of FIG. 8.
Figure 13:
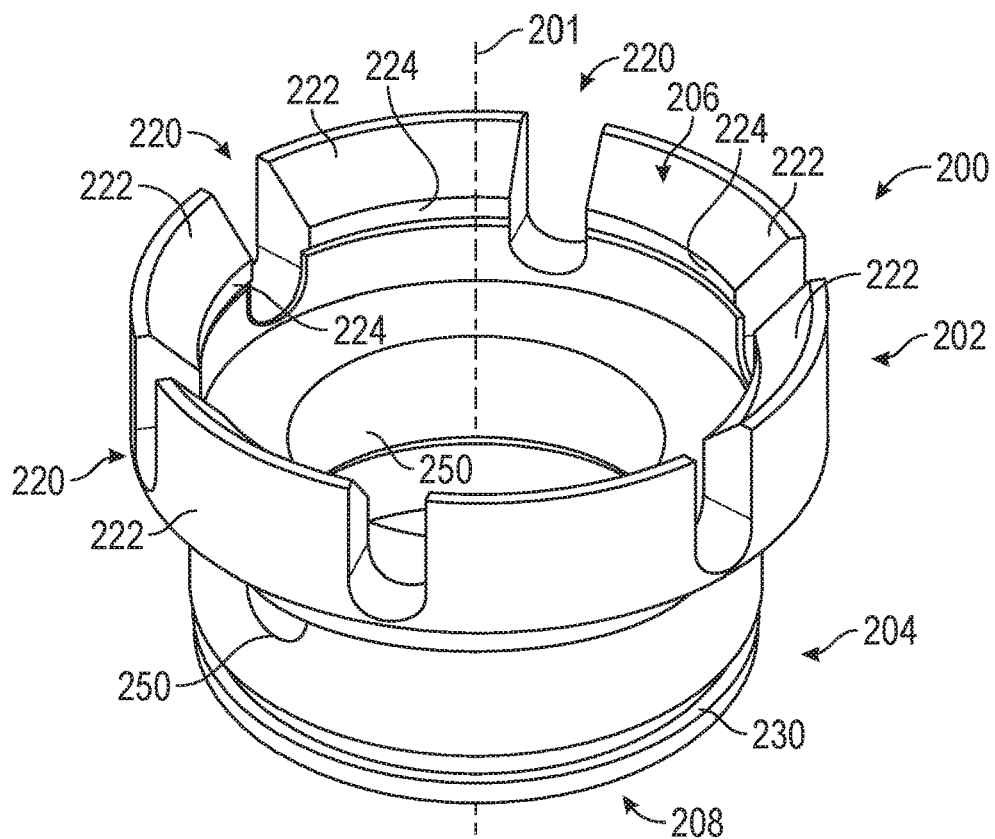
FIG. 13 is a front perspective view of a nozzle for use with a frozen food product dispensing machine, according to another exemplary embodiment.
Figure 14:
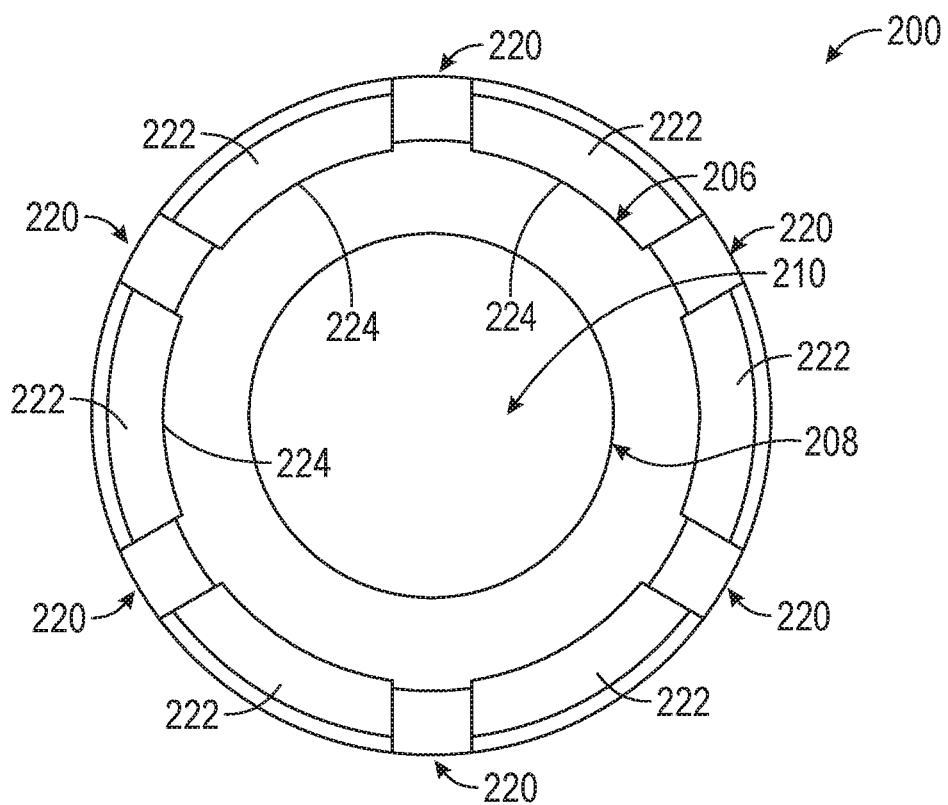
FIG. 14 is a top view of the nozzle of FIG. 13.
Figure 15:
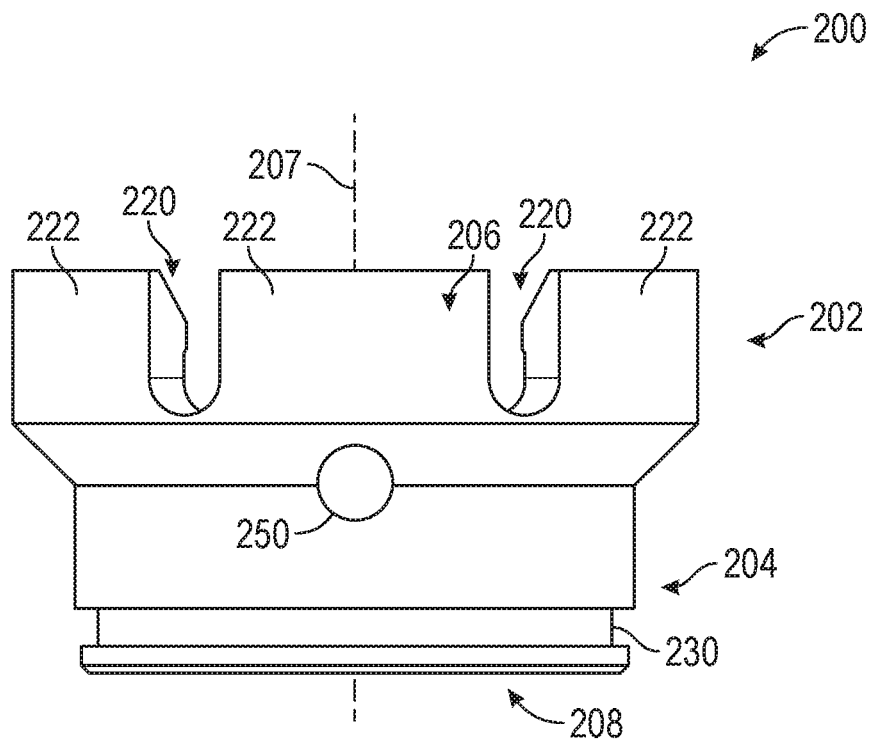
FIG. 15 is a side view of the nozzle of FIG. 13.
Figure 16:
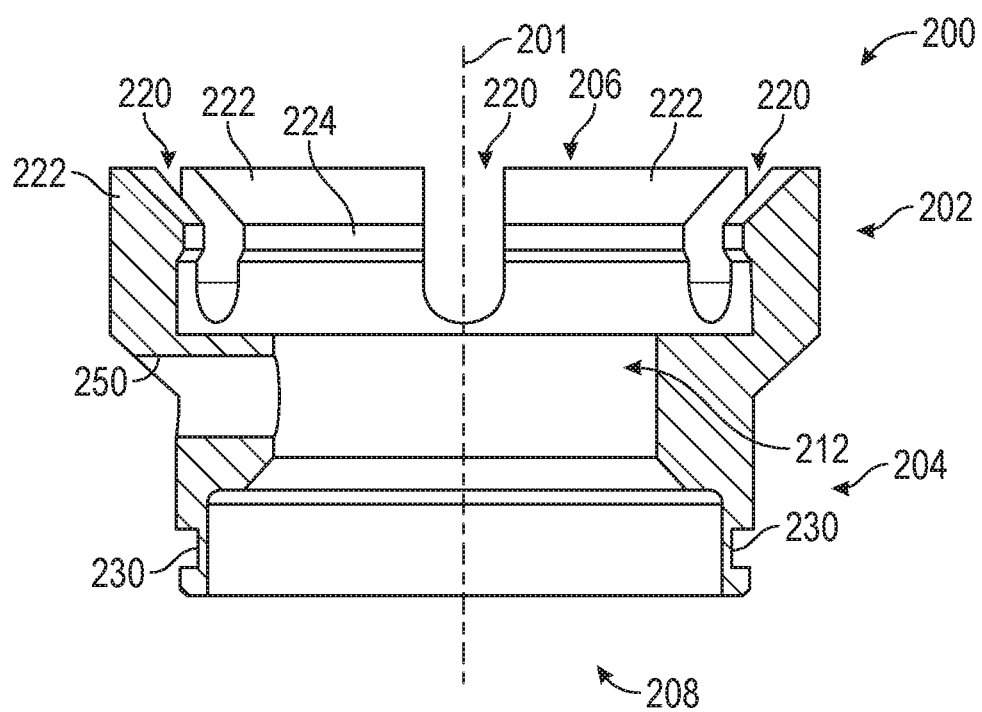
FIG. 16 is a front section view of the nozzle of FIG. 13.

Referring to FIGS. 5-7, a series of cylindrical or annular protrusions or spouts, shown as spigot protrusions 160, are coupled to the front door 102. In some embodiments, the spigot protrusions 160 are integrally formed with and fixedly coupled to the front door 102. The spigot protrusions 160 extend downward from the front door 102. Each spigot protrusion 160 is axially centered about one of the side valve passages 120 or mixing valve passage 124 (e.g., about a vertical central axis extending through the center of the corresponding passage). The side valve passages 120 and the mixing valve passage 124 extend through the corresponding spigot protrusions 160 such that the spigot protrusions 160 define the bottom of each passage. Each spigot protrusion 160 further defines an annular recess, groove, or slot, shown as nozzle retaining groove 162, extending around (e.g., partially around, completely around, etc.) a circumference of the spigot protrusion 160.

Referring to FIGS. 4 and 5, the dispensing machine 10 includes a series of rinsing nozzles or spouts, shown as nozzles 200. The nozzles 200 are each selectively coupled to one of the spigot protrusions 160. By way of example, the nozzles 200 may engage (e.g., extend into) the nozzle retaining grooves 162. By way of another example, the nozzles 200 may be in threaded engagement with the nozzle retaining grooves 162. The nozzles 200 are each fluidly coupled with the corresponding side valve passage 120 or mixing valve passage 124 such that food product passes through the nozzle 200 prior to exiting the dispensing machine 10 (e.g., into a cone, cup, or dish, etc.). The nozzles 200 each include a port (e.g., the cleaning fluid inlet 250) that facilitates the introduction of cleaning fluid into the nozzles 200 for periodic cleaning.

Referring to FIGS. 8-11, the nozzle 200 is shown according to an exemplary embodiment. The nozzle 200 extends along a central, longitudinal axis, shown as longitudinal axis 201. When the nozzle 200 is installed, the longitudinal axis 201 is substantially vertical and aligned with the central axis of the corresponding passage of the front door 102. The nozzle 200 includes two sections, portions, walls, or bodies: an interface portion 202 and a nozzle portion 204. The interface portion 202 and the nozzle portion 204 are substantially cylindrical and centered about the longitudinal axis 201. The interface portion 202 and the nozzle portion 204 may be integrally formed with and fixedly coupled to one another. The interface portion 202 has a larger outer diameter than the nozzle portion 204. The interface portion 202 is configured to be coupled to the spigot protrusion 160. The nozzle portion 204 is downstream of the interface portion 202. The interface portion 202 defines a first food product aperture or inlet, shown as inlet 206, and the nozzle portion 204 defines a second food product aperture or outlet, shown as outlet 208. A nozzle passage, shown as central passage 210, extends from the inlet 206 to the outlet 208. The central passage 210 is substantially centered about and aligned with the longitudinal axis 201.

The interface portion 202 defines a series of slots or grooves, shown as slots 220, extending radially therethrough. The slots 220 are arranged around the circumference of the interface portion 202 and extend between a top surface, an inner surface, and an outer surface of the interface portion 202. As shown, the interface portion 202 defines six slots evenly spaced about the circumference of the interface portion 202. In other embodiments, the interface portion 202 defines more or fewer slots 220 that are otherwise spaced. Extending between the slots 220 are a series of protrusions, shown as tabs 222. The tabs 222 extend substantially vertically, away from the nozzle portion 204. Extending radially inward from each tab 222 is a radial protrusion, shown as retaining protrusion 224.

The retaining protrusions 224 are configured to be received within the nozzle retaining groove 162 to selectively couple the nozzle 200 to the spigot protrusion 160. The surface of each tab 222 adjacent the retaining protrusion 224 may be tapered. To couple the nozzle 200 to the spigot protrusion 160, the spigot protrusion 160 may be placed in contact with the tapered surface of each tab 222, and the nozzle 200 may be forced upward. This may force the tabs 222 to elastically bend outward. When the retaining protrusions 224 are aligned with the nozzle retaining groove 162, the tabs 222 may return to their original positions, inserting the retaining protrusions 224 into the nozzle retaining groove 162. In some embodiments, the retaining protrusions 224 and the nozzle retaining groove 162 each extend along a circular path (e.g., are annular) such that the nozzle 200 can be rotated about the longitudinal axis 201 relative to the spigot protrusion 160.

The nozzle portion 204 further defines an annular slot or groove, shown as cap groove 230, extending around (e.g., partially or completely around) a circumference of the nozzle portion 204 (e.g., partially or completely surrounding the central passage 210). Between the cap groove 230 and the interface portion 202, a pair of protrusions, shown as coupling protrusions 240, extend radially outward from the nozzle portion 204. The coupling protrusions 240 are configured to facilitate coupling the nozzle 200 to one or more components. By way of example, the coupling protrusions 240 may provide a seat for a wrench or other tool that is used to install or remove the nozzle 200 from the dispensing machine 10. By way of another example, the coupling protrusions 240 may engage and/or couple to the cap 300.

Referring to FIGS. 4, 5, and 8-12 the nozzle 200 further defines an aperture, shown as cleaning fluid inlet 250. The cleaning fluid inlet 250 extends laterally (e.g., substantially perpendicular to the longitudinal axis 201) through one wall of the nozzle portion 204, fluidly coupling the central passage 210 to the exterior of the nozzle 200. The cleaning fluid inlet 250 is positioned between the inlet 206 and the outlet 208. The cleaning fluid inlet 250 is configured (e.g., shaped, sized, threaded, coupled to one or more fittings, etc.) to be coupled to the end of a conduit (e.g., a pipe, a tube, a hose, etc.), shown as hose 252. The hose 252 is configured to be selectively supply a cleaning fluid (e.g., water, a solution of water and a detergent, etc.) to the central passage 210 through the cleaning fluid inlet 250. In other embodiments, the nozzle 200 defines additional cleaning fluid inlets 250 (e.g., 2, 3, 4, 6, 8, 10, etc. in total). Each cleaning fluid inlet 250 may receive cleaning fluid through a hose 252. By way of example, the nozzle 200 may define three cleaning fluid inlets 250, each angularly offset from one another about the longitudinal axis 201 (e.g., by approximately 120 degrees). Each such cleaning fluid inlet 250 may be fluidly coupled to a hose 252.

Referring to FIGS. 13-16, the nozzle 200 is shown according to an exemplary embodiment. The embodiment of the nozzle 200 shown in FIGS. 13-16 may be substantially similar to the embodiment of the nozzle 200 shown in FIGS. 8-12, except as otherwise specified herein. The relative sizes (e.g., diameters, lengths, etc.) of the interface portion 202 and the nozzle portion 204 vary between the two embodiments. As shown in FIGS. 13-16, the coupling protrusions 240 are omitted.

Figure 17:
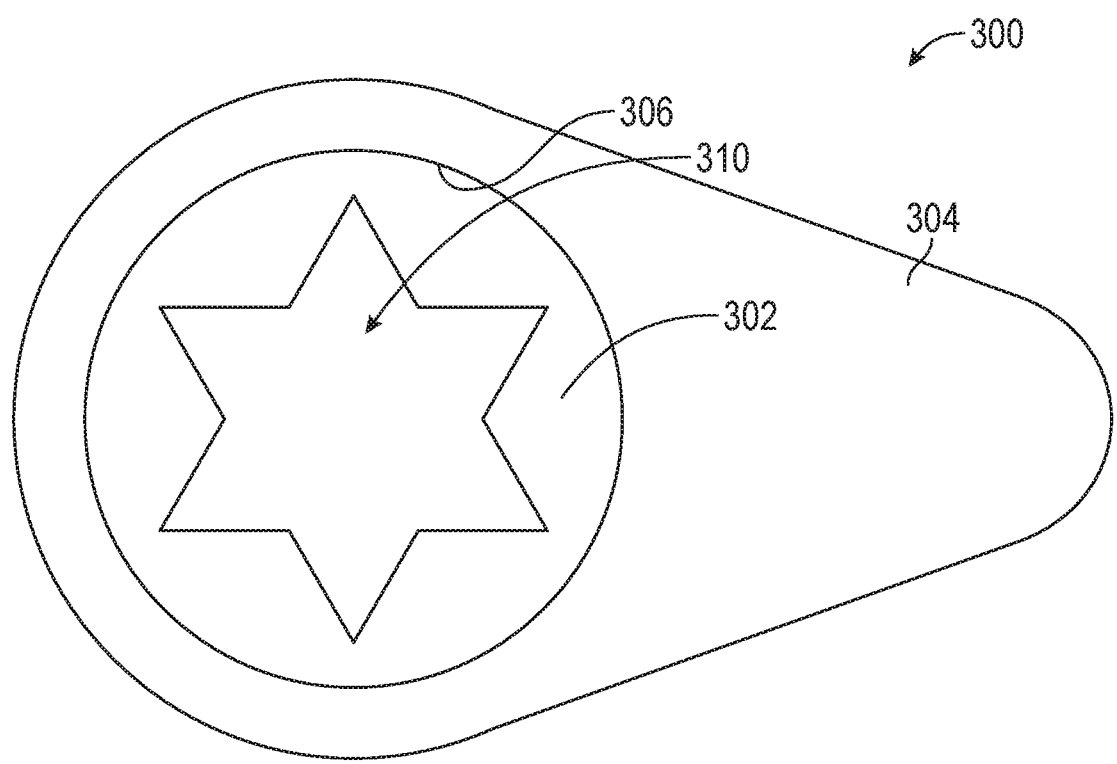
FIG. 17 is a top view of a cap for use with a frozen food product dispensing machine, according to an exemplary embodiment.
Figure 18:
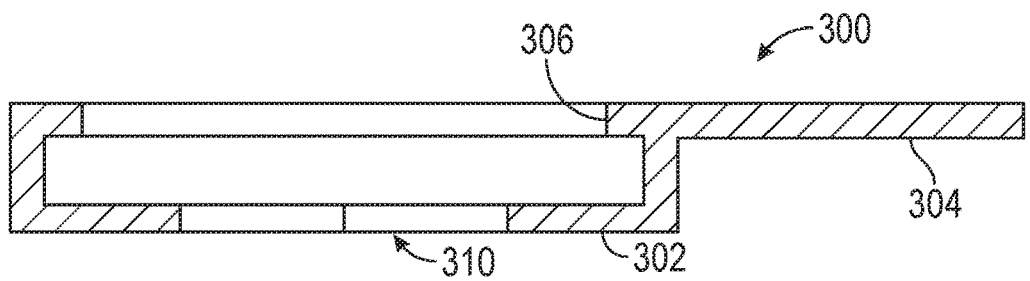
FIG. 18 is a front section view of the cap of FIG. 17.

Referring to FIGS. 5, 17, and 18, the dispensing system 100 further includes a series of covers, nozzles, caps, or shapers, shown as caps 300. The caps 300 are selectively coupled to the nozzles 200. Each cap 300 includes a cup-shaped body, shown as main body 302. A lever or protrusion, shown as handle 304, is coupled to the main body 302 and extends outward from the main body 302. The main body 302 defines a recess configured to receive an end of the nozzle portion 204 of the rinsing nozzle 204. A protrusion, shown as annular protrusion 306, extends radially inward from the main body 302. When the cap 300 is fully seated on the nozzle 200, the annular protrusion 306 extends into the cap groove 230 to couple the cap 300 to the nozzle 200. To couple the cap 300 to the nozzle 200 or decouple the cap 300 from the nozzle 200, the cap 300 may be deformed to expand the annular protrusion 306 such that the annular protrusion 306 fits over the end of the nozzle portion 204. As such, the cap 300 may be made from a compliant material, such as plastic. The handle 304 may facilitate applying a bending torque on the cap 300 to facilitate such deformation.

The main body 302 of the cap 300 defines an aperture, shown as forming aperture 310. The forming aperture 310 is configured (e.g., shaped) to form the food product into an extrusion having a desired cross-sectional shape. In some embodiments, the forming aperture 310 has a cross-sectional area less than a cross-sectional area of the outlet 208. This may facilitate the forming aperture 310 dictating the final cross-sectional shape and size of the food product as the food product is dispensed. As shown, the forming aperture 310 has a non-circular, star shape and produces a corresponding star-shaped extrusion of food product. In other embodiments, the forming aperture 310 is otherwise shaped.

By way of example, the forming aperture 310 may have other non-circular shapes (e.g., stars with a different quantity of points, squares, triangles, etc.). In other embodiments, the forming aperture 310 is circular. The forming aperture 310 may substantially centered about the longitudinal axis 201 when the cap 300 is coupled to the nozzle 200. In other embodiments, the caps 300 are omitted, and the outlet 208 of the nozzle 200 defines the cross-sectional shape of the extruded food product.

Figure 19:
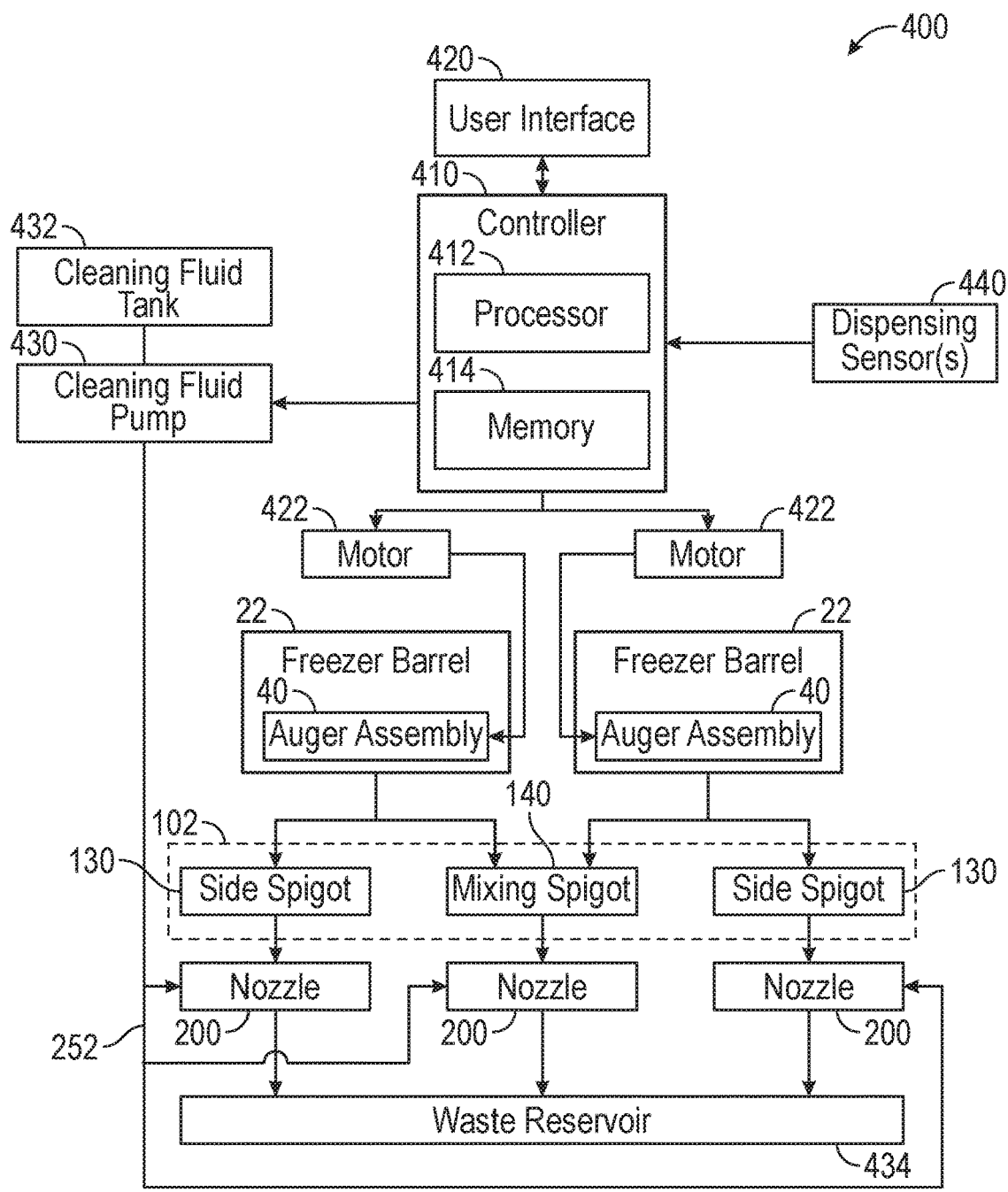
FIG. 19 is a block diagram of a control system of a frozen food product dispensing machine, according to an exemplary embodiment.

Referring to FIG. 19, a control system 400 for the dispensing machine 10 is shown according to an exemplary embodiment. The control system 400 includes a controller 410 configured to control some or all aspects of the operation of the dispensing machine 10. The controller 410 includes a processor 412 and a memory 414. In other embodiments, the controller 410 is and/or includes a switch or valve that selectively supplies electrical energy and/or fluid power to a component (e.g., the cleaning fluid pump 430) to selectively activate the component. The controller 410 may receive inputs (e.g., data, sensor inputs, commands from a user, a mechanical movement, such as the toggling of a switch, etc.), process the input according to one or more routines (e.g., stored in memory 414) to determine one or more actions, and provide commands (e.g., data, electrical energy, etc.) to one or more other devices based on the determination.

The controller 410 is operatively coupled to the user interface 420. The controller 410 may provide data to the user interface 420 for communication to a user. By way of example, the controller 410 may provide data relating to the status of one or more systems (e.g., a fault condition, an indication that one or more of the hopper cavities 16 need to be refilled, etc.). The controller 410 may additionally or alternatively receive data from the user interface 420. By way of example, the controller 410 may receive commands provided by a user through the user interface 420 (e.g., a temperature set point for the freezer barrels 22, a "start" or "stop" command for rotation of the auger assemblies 40, a command to initiate a cleaning cycle of the nozzles 200, etc.). The user interface 420 may include screens (e.g., touchscreens), buttons, switches, knobs, levers, microphones, speakers, or any other type of device configured to provide information to a user or receive an input from a user.

The controller 410 is operatively coupled to a pair of drivers (e.g., electric motors), shown as motors 422. The controller 410 is configured to control operation of the motors 422 (e.g., a direction of rotation, a rotation speed, etc.). The motors 422 are configured to selectively supply a torque to the auger assemblies 40 to agitate food product within the freezer barrels 22. During operation, the motors 422 are configured to cause the auger assemblies to rotate and move food product toward the front door 102 for dispensing. When in their respective sealing positions, the side spigots 130 and the mixing spigot 140 prevent the food product from being dispensed through the front door 102. When in their respective dispensing positions, the side spigots 130 and the mixing spigot 140 permit the food product to flow out of the front door 102, through the respective nozzle 200, and into a receptacle (e.g., a cone or dish) provided by a user. In some embodiments, the motors 422 operate constantly when the dispensing machine 10 is powered on.

The controller 410 is operatively coupled to a supply or source of cleaning fluid or cleaning fluid source, shown as cleaning fluid pump 430. The controller 410 may be configured to control operation (e.g., a discharge speed, an activation status, etc.) of the cleaning fluid pump 430. The cleaning fluid pump 430 is fluidly coupled to a supply or source of cleaning fluid (e.g., a tank, a reservoir, a bucket, etc.) or cleaning fluid source, shown as cleaning fluid tank 432. The cleaning fluid may include any fluid that removes waste from, sterilizes, or otherwise cleans components of the dispensing machine 10. By way of example, the cleaning fluid may include water or a solution of water and bleach. By way of another example, the cleaning fluid may include water mixed with a detergent. The cleaning fluid pump 430 is fluidly coupled to the hoses 252. The cleaning fluid pump 430 may be coupled to each hose 252 individually or through a manifold. The cleaning fluid pump 430 is configured to draw cleaning fluid from the cleaning fluid tank 432 and force the cleaning fluid through the hoses 252, through the cleaning fluid inlets 250 of the nozzles 200, and into the central passages 210. Once in the central passages 210, the cleaning fluid removes (e.g., rinses) food product from interior surfaces of the rinsing nozzle and the cap 300 and sterilizes the nozzle 200 and the cap 300, exiting through the outlet 208 and the forming aperture 310.

In other embodiments, a different type of cleaning fluid source is utilized. By way of example, the cleaning fluid pump 430 may be omitted, and the cleaning fluid tank 432 may be raised to feed the cleaning fluid to the nozzles 200 by gravity. In such an embodiment, a valve may be placed between the cleaning fluid tank 432 and the nozzles 200 to control (e.g., selectively prevent) the flow of cleaning fluid between the cleaning fluid tank 432 and the nozzles 200. Such a valve may be electronically operated (e.g., by the controller 410) or operated by hand.

The dispensing machine 10 may further include a drain, receptacle, tank, bucket, reservoir, trough, or outlet, shown as waste reservoir 434. The waste reservoir 434 may be selectively arranged to receive the soiled cleaning fluid dispensed from the nozzles 200. The waste reservoir 434 may facilitate storage and/or disposal of the soiled cleaning fluid. By way of example, the waste reservoir 434 may be a bucket that can be selectively arranged beneath the nozzles 200 such that the cleaning fluid falls into the bucket. The bucket may then be transported to a location where the cleaning fluid may be disposed of (e.g., a sink). By way of another example, the waste reservoir 434 may be a drip tray that is built into the housing 12 of the dispensing machine 48 10. In such an embodiment the drip tray may store the cleaning fluid within a tank, or the drip tray may supply the cleaning fluid to a drain through one or more conduits.

In some embodiments, the control system 400 includes one or more sensors, shown as dispensing sensor 440, operatively coupled to the controller 410. The dispensing sensors 440 may be coupled to the actuators 150 and/or the dispensing handles 152 and configured to indicate when the corresponding side spigot 130 and/or mixing spigot 140 have moved to the dispensing position. By way of example, the dispensing sensors 440 may include micro switches that are pressed by the actuators 150 only when the corresponding side spigot 130 or mixing spigot 140 are in the sealing position. Such dispensing sensors 440 may facilitate automatic control of the cleaning fluid pump 430. The controller 410 may use this information (e.g., the indication of whether or not the food product is being dispensed or has been dispensed recently) to control the cleaning fluid pump 430. By way of example, the controller 410 may control the cleaning fluid pump 430 such that the cleaning fluid pump 430 is prevented from operating when (a) a user is currently dispensing food product or (b) has dispensed food product within a predetermined time period (e.g., 30 seconds, 10 minutes, an hour, etc.). This prevents an accidental discharge of the cleaning fluid when a user is dispensing food product.

Figure 20:
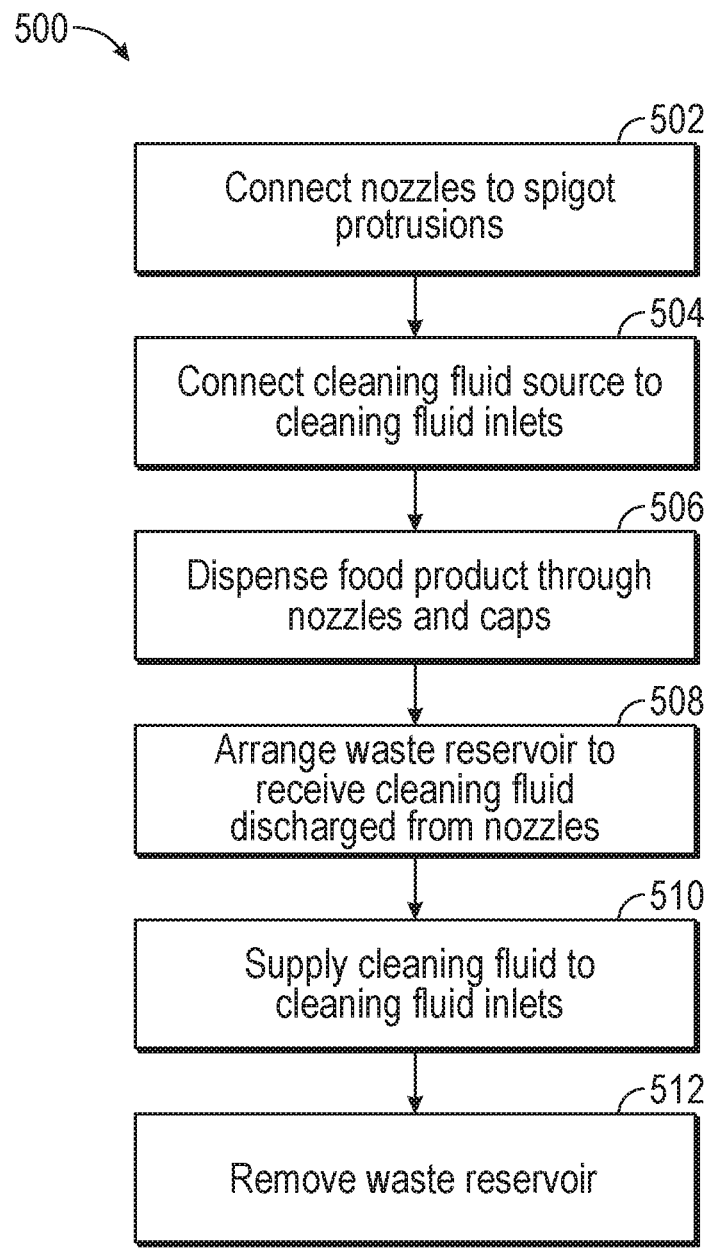
FIG. 20 is a block diagram of a method of using a frozen food product dispensing machine, according to an exemplary embodiment.

Referring to FIG. 20, a method 500 for using (e.g., providing, operating, cleaning, etc.) the dispensing machine 10 is shown, according to an exemplary embodiment. In step 502, the nozzles 200 are connected to the spigot protrusions 160. A user (e.g., a purveyor of frozen food product, a producer of the dispensing machine 10, etc.) may provide a dispensing machine 10 and one or more nozzles 200. The user may then arrange each nozzle 200 beneath one of the spigot protrusions 160 and apply an upward force to the nozzle 200 until the retaining protrusions are received within the nozzle groove 162, coupling the nozzle 200 to the front door 102. The user may also couple the caps 300 to the corresponding nozzles 200. By way of example, using the handle 304, the user may press the main body 302 of the cap 300 onto the nozzle 200.

In step 502, the cleaning fluid source is connected to the cleaning fluid inlets 250 of the nozzles 200. Step 502 may include fluidly coupling the cleaning fluid tank 432 to the cleaning fluid pump 430 and fluidly coupling the cleaning fluid pump 430 to each nozzle 200. By way of example, a user may utilize multiple dispensing machines 10 and a single cleaning fluid pump 430 that is shared between each of the dispensing machines 10. The cleaning fluid tank 432 may be a bucket of cleaning fluid, and the cleaning fluid pump 430 may include a hose that extends into the bucket. A user may connect the hose 252 (e.g., by hand onto a fitting) to the cleaning fluid pump 430 and each nozzle 200. After cleaning the nozzles 200 of that dispensing machine 10, the user may disconnect the hose 252, and connect the cleaning fluid pump 430 to the hose 252 of another dispensing machine 10. By way of another example, the cleaning fluid tank 432 and the cleaning fluid pump 430 may be contained within the housing 12, and the hose 252 may extend from the nozzles 200 to the cleaning fluid pump 430 as assembled from the factory.

In step 506, food product is dispensed through the nozzles 200. It should be noted that step 506 may be completed before, after, and/or between steps 502 and 504. A user may initiate dispensing of the food product through the dispensing handles 152 (e.g., by rotating the handles 152) or through the user interface 420 (e.g., by pressing a "dispense" button). In response, the actuators 150 may raise one or more of the side spigots 130 and the mixing spigot 140, permitting the flow of food product out of the corresponding nozzles 200. The user may continue to control the actuators 150 until a desired volume of food product has been dispensed. In some embodiments, dispensing machine 10 is an automated dispensing machine. In such embodiments, the controller 410 may control some or all operation of the dispensing machine 10. By way of example, in response to receiving a request for food product (e.g., provided by a user through the user interface 420), the controller 410 may control the actuators 150 to dispense a predetermined volume of food product into a dish or cone and provide the filled dish or cone to a user without the user directly controlling the actuators 150.

When the food product is dispensed, some of the food product remains trapped within the nozzles 200. This food product is exposed to the atmosphere, and as such may reach an undesirable state (e.g., room temperature) if left out for an extended period of time. Additionally, if the flavor of food product being dispensed from a nozzle 200 is changed (e.g., chocolate to vanilla), this remaining food product may contaminate a portion of the new food product with the old flavor. Accordingly, it may be desirable to periodically clean the nozzles 200. In some situations, it is desirable for this cleaning to occur more frequently than the entire dispensing machine 10 is disassembled and cleaned (e.g., once per hour versus once per day). The cleaning fluid inlet 250 may facilitate cleaning the nozzle 200 and the cap 300 without disassembling the dispensing machine 10.

In step 508, the waste reservoir 434 is arranged to receive the cleaning fluid discharged from the nozzles 200. By way of example, the waste reservoir 434 may be a bucket, and the bucket may be arranged beneath the nozzles 200 to catch the soiled cleaning fluid as it leaves the caps 300. By way of another example, the waste reservoir 434 may include a drip tray, and the drip tray may be coupled to the housing 12 during construction of the dispensing machine 10. Such a drip tray may be fluidly coupled to a tank or reservoir within the housing 12, or the drip tray may be fluidly coupled to a drain (e.g., leading to a sewer or other liquid disposal device). The use of a built-in drip tray may facilitate periodically cleaning the nozzles 200 without having to set up the waste reservoir 434 repeatedly. Such a built-in drip tray may facilitate automated cleaning of the nozzles 200 (e.g., initiated automatically by the controller 410).

In step 510, the cleaning fluid is supplied to the cleaning fluid inlets 250. By way of example, the controller 410 may command the cleaning fluid pump 430 to initiate pumping of cleaning fluid from the cleaning fluid tank 432 to the cleaning fluid inlets 250 through the hoses 252 (e.g., in response to pressing a button of the user interface 420, in response to flipping a switch, etc.). In embodiments where the controller 410 is a switch, the controller 410 may simply selectively permit electrical energy to be supplied to the cleaning fluid pump 430 to initiate pumping of cleaning fluid. The cleaning fluid passes through the cleaning fluid inlets 250 and engages the inner surfaces of the nozzles 200 and the caps 300, removing any food product and sterilizing the inner surfaces. The soiled cleaning fluid passes out through the outlets 208 and the forming apertures 310 and is received by and stored within the waste reservoir 434.

In some embodiments, step 510 is initiated manually by a user. By way of example, a user may provide a "begin cleaning" command through the user interface 420 to command the controller 410 to operate the cleaning fluid pump 430. By way of another example, the user may manually initiate the flow of cleaning fluid by opening a valve (e.g., without the use of a controller 410).

In other embodiments, the controller 410 automatically initiates the flow of cleaning fluid. By way of example, the controller 410 may initiate the flow of cleaning fluid periodically (e.g., in response to a determination that a cleaning period has elapsed). The cleaning period may correspond to a desired period between cleanings of the nozzles 200. The controller 410 may determine that the cleaning period has elapsed at specific times of day (e.g., at 1 pm, at 2 pm, etc.). The controller 410 may determine that the cleaning period has elapsed at specific time intervals (e.g., as once every hour, etc.). The controller 410 may determine when to initiate or prevent the flow of cleaning fluid based on an indication of when food product has been dispensed from the dispensing sensors 440. In embodiments where the controller 410 automatically and/or periodically causes cleaning fluid to flow, an indication that food product has been dispensed may prevent an otherwise-scheduled flow of cleaning fluid. The controller 410 may prevent cleaning fluid from flowing while food product is being dispensed. The controller 410 may reset the cleaning period after food product has been dispensed. By way of example, the controller 410 may reset the cleaning period to a predetermined length (e.g., 30 seconds, 10 minutes, an hour, etc.) in response to dispensing of food product. This may effectively prevent the dispensing of cleaning fluid for a predetermined period after food product has been dispensed.

In step 512, the waste reservoir 434 is removed. By way of example, the user may remove a bucket from the dispensing machine 10. In other embodiments, step 512 is omitted, and the waste reservoir 434 is constantly connected to the dispensing machine 10.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the frozen food product dispensing system as shown in the various exemplary embodiments is illustrative only. Additionally, any element disclosed in one embodiment may be incorporated or utilized with any other embodiment disclosed herein. For example, the coupling protrusions 240 of the nozzle 200 of the exemplary embodiment shown in FIG. 8 may be incorporated in the nozzle 200 of the exemplary embodiment shown in FIG. 13. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method of using a frozen food product dispensing machine, comprising:
    coupling a cap to a nozzle, wherein the nozzle is coupled to the frozen food product dispensing machine;
    producing, by the frozen food product dispensing machine, a frozen food product;
    dispensing, by the frozen food product dispensing machine, the frozen food product through a nozzle passage of the nozzle, wherein the nozzle defines a food product inlet fluidly coupled to the frozen food product dispensing machine and a food product outlet, and wherein the nozzle passage extends between the food product inlet and the food product outlet; and
    introducing, by a cleaning fluid source, a cleaning fluid into the nozzle passage through a cleaning fluid inlet in the nozzle,
    wherein the cleaning fluid inlet is fluidly coupled to the nozzle passage between the food product inlet and the food product outlet; and
    wherein the cap extends across the food product outlet and the cap defines a forming aperture.

2. The method of claim 1, wherein dispensing the frozen food product includes moving a valve member from a sealing position to a dispensing position, wherein the valve member extends into a valve passage fluidly coupled to the nozzle passage, wherein the valve member prevents flow of food product through the valve passage when the valve member is in the sealing position and permits flow of food product through the valve passage when the valve member is in the dispensing position.

3. The method of claim 2, wherein the frozen food product dispensing machine further includes a spigot protrusion at least partially defining the valve passage, and wherein the nozzle is directly coupled to the spigot protrusion.

4. The method of claim 3, wherein the valve passage and the nozzle passage are substantially aligned.

5. The method of claim 1, wherein the nozzle selectively couples to a protrusion of the frozen food product dispensing machine such that the nozzle can be removed from the frozen food product dispensing machine.

6. The method of claim 1, wherein the forming aperture has a first cross-sectional area, and wherein the food product outlet has a second cross-sectional area greater than the first cross-sectional area.

7. The method of claim 6, wherein the nozzle selectively couples to a protrusion of the frozen food product dispensing machine such that the nozzle can be removed from the frozen food product dispensing machine, and wherein the cap selectively couples to the nozzle such that the cap can be removed from the nozzle.

8. The method of claim 1, further comprising:
    determining, by a controller, when a cleaning period has elapsed,
    wherein introducing the cleaning fluid into the nozzle passage includes introducing the cleaning fluid in response to a determination that the cleaning period has elapsed.

9. The method of claim 1, further comprising:
    determining, by a controller, when the frozen food product dispensing machine is dispensing food product; and
    preventing, by the controller, the cleaning fluid source from introducing the cleaning fluid into the nozzle passage when the frozen food product dispensing machine is dispensing food product.

* * * * *